UNITED STATES PATENT OFFICE.

WILLIAM ECKFORD, OF RHYL, WALES.

MANUFACTURE OF LEAD PASTE FROM RED OR ORANGE LEAD.

1,128,961.  Specification of Letters Patent.  Patented Feb. 16, 1915.

No Drawing.  Application filed April 9, 1910.  Serial No. 554,516.

*To all whom it may concern:*

Be it known that I, WILLIAM ECKFORD, a subject of the King of Great Britain, residing in Rhyl, in the county of Flint and Principality of Wales, have invented certain new and useful Improvements in the Manufacture of Lead Paste from Red or Orange Lead, of which the following is a specification.

This invention has for its object improvements in the manufacture of red and orange lead and of paint therefrom.

Red and orange lead as ordinarily prepared contains various impurities which render it undesirable for various purposes. For example where the red lead is used for high class glass making the presence of oxid of iron is very injurious. The presence of other oxids or metallic compounds is often injurious. Different trades require red or orange lead free from different impurities, thus the presence of small quantities of copper or iron is not harmful in the case of lead paste or paint. In the latter case, however, the presence of lead monoxid is a great disadvantage, since this compound acts as a hardener or thickener when the pigment is mixed with linseed oil and the like. As a result the mixed paste or paint hardens or thickens. Hence red lead is very rarely sent out as paste, but almost always in the dry state, whereas white lead is generally sent out as paint or as a stiff paste with oil. But to be able to send red lead or orange lead as paint or as a stiff paste is a great desideratum.

The object of my invention is to provide means for eliminating or partly eliminating the lead monoxid, oxid or iron and other impurities from the red and orange lead. The purified red and orange lead can then be used for making lead paste and paint which will keep for a reasonable length of time without hardening or thickening.

After treating in accordance with my invention, the red and orange lead may be sent out as paint or ground into a stiff paste with linseed oil, varnish and the like.

Now according to my invention I treat red or orange lead with dilute acetic acid, lead acetate, or a mixture of these. By this treatment the lead monoxid is reduced or removed, and so long as the solution contains free acid the oxids of iron, copper, zinc, and other impurities are also reduced or removed. After the lead monoxid and other impurities have been dissolved out, the red or orange lead is washed with water, the wash-water being kept for use in subsequent operations, and the residuum red or orange lead finally dried. The lead in the solutions is extracted by usual known methods.

I find when drying the residuum red or orange lead that there is a danger of monoxid of lead again forming so that when the dried pigment is ground with oil there is a slight tendency for the paste or paint to harden or thicken.

When the paste or paint is to be stored a considerable time before use, it is important that the tendency to harden or thicken shall be as small as possible.

To avoid the reduction which occurs on drying, I grind the pigment in the wet or pulp state with oil or other suitable menstruum. There is such an affinity between red and orange lead and oil, that when a pulp of these substances is mixed with oil, the pigment enters the oil leaving a layer of water which may then be run off. The mixing may be carried out in a pugging mill, edge runner, or other suitable mixing machine, until the oil has combined with the purified red or orange lead, the water being set free and drained off.

The strong affinity between the red and orange lead and oil is probably due to the electrical charges carried by the substances involved. The oil only combines with the solid particles and has no solvent action or affinity for the dissolved substances present in the water. The red lead therefore need not be separated from the acetate solution before mixing or grinding with oil.

By my invention the very finest paste or paint can be produced, and kept in a satisfactory condition for a period of months or possibly years.

I declare that what I claim is:—

1. A process for producing a paste which can be stored without hardening, from red or orange lead, comprising treating the red or orange lead with a solution containing the acetyl radical, washing with water and grinding the wet mass with oil in order to prevent the formation of lead monoxid.

2. A process for producing a paste which can be stored without hardening, from red or orange lead, comprising treating the red or orange lead with lead acetate in order to remove lead monoxid, washing with water and grinding the wet mass with oil in order to prevent the formation of lead monoxid.

3. As a new product of manufacture a lead paste which will not harden on storage, consisting of oil incorporated with red or orange lead free from lead monoxid, substantially as described.

In witness whereof, I have hereunto signed my name this 1st day of April 1910, in the presence of two subscribing witnesses.

W. ECKFORD.

Witnesses:
G. C. DYMOND,
RICHARD W. WILLIAMS.